(12) United States Patent
Kojima

(10) Patent No.: US 8,537,191 B2
(45) Date of Patent: Sep. 17, 2013

(54) LENS HOLDING UNIT, OPTICAL SCANNING DEVICE AND IMAGE FORMING APPARATUS

(75) Inventor: Takahiro Kojima, Shizuoka-ken (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 6 days.

(21) Appl. No.: 13/315,724

(22) Filed: Dec. 9, 2011

(65) Prior Publication Data

US 2012/0182370 A1 Jul. 19, 2012

Related U.S. Application Data

(60) Provisional application No. 61/432,439, filed on Jan. 13, 2011.

(30) Foreign Application Priority Data

Oct. 25, 2011 (JP) ................. P2011-233488

(51) Int. Cl.
*B41J 2/385* (2006.01)
*B41J 2/41* (2006.01)
*B41J 2/435* (2006.01)

(52) U.S. Cl.
USPC ............ 347/245; 347/138; 347/152; 347/263

(58) Field of Classification Search
None
See application file for complete search history.

(56) References Cited

U.S. PATENT DOCUMENTS

| 5,257,138 | A | * | 10/1993 | Yamaguchi et al. | ......... 359/819 |
| 7,470,070 | B2 | | 12/2008 | Kojima | |
| 7,557,821 | B2 | | 7/2009 | Endo et al. | |
| 2007/0103737 | A1 | * | 5/2007 | Nakajima | ............. 358/474 |
| 2008/0050151 | A1 | * | 2/2008 | Kato et al. | ............. 399/221 |

FOREIGN PATENT DOCUMENTS

JP 2003-060277 2/2003

* cited by examiner

*Primary Examiner* — Matthew Luu
*Assistant Examiner* — Kendrick Liu
(74) *Attorney, Agent, or Firm* — Patterson & Sheridan, L.L.P.

(57) ABSTRACT

According to one embodiment, a lens holding unit includes a laser diode to irradiate laser beam, a lens through which the laser beam passes, a sheet metal having a bottom surface to hold a bottom portion of the lens and a sidewall which uprises from the bottom surface at a right angle and holds a side portion of the lens, and a first resin member fixed to the bottom surface of the sheet metal to hold a side portion at the other side of the lens which is held on the sheet metal.

12 Claims, 8 Drawing Sheets

LENS HOLDING UNIT, OPTICAL SCANNING DEVICE AND IMAGE FORMING APPARATUS

CROSS-REFERENCE TO RELATED APPLICATION

This application is based upon and claims the benefit of priority from the prior U.S. Patent Application No. 61/432,439, filed on Jan. 13, 2011, the entire contents of which are incorporated herein by reference.

This application is also based upon and claims the benefit of priority from the prior Japanese Patent Application No. 2011-233488, filed on Oct. 25, 2011, the entire contents of which are incorporated herein by reference.

FIELD

Exemplary embodiments described herein relate to a lens holding unit, an optical scanning device and an image forming apparatus.

BACKGROUND

Conventionally, a holder to hold a collimator lens was made by aluminium die casting. However, if the holder is made by aluminium die casting, a problem is caused that after aluminium die casting, in order to perform positioning of a collimator lens, post-processing to make the holder in a plane shape and post-processing, such as, to form screw holes are required.

DETAILED DESCRIPTION

In general, according to one embodiment, there is provided a lens holding unit including a laser diode to irradiate laser beam, a lens through which the laser beam passes, a sheet metal having a bottom surface to hold a bottom portion of the lens and a sidewall which uprises from the bottom surface at a right angle and holds a side portion of the lens, and a first resin member fixed to the bottom surface of the sheet metal to hold a side portion at the other side of the lens which is held on the sheet metal.

Hereinafter, image forming apparatuses according to embodiments will be described with reference to the accompanied drawings.

(First Embodiment) A lens holding unit of an optical scanning device provided in an image forming apparatus according to a first embodiment is composed by the combination of an L-shaped sheet metal having a portion to hold a side portion at one side of a lens and a resin member to hold a side portion at the other side of the lens.

Figure 1:
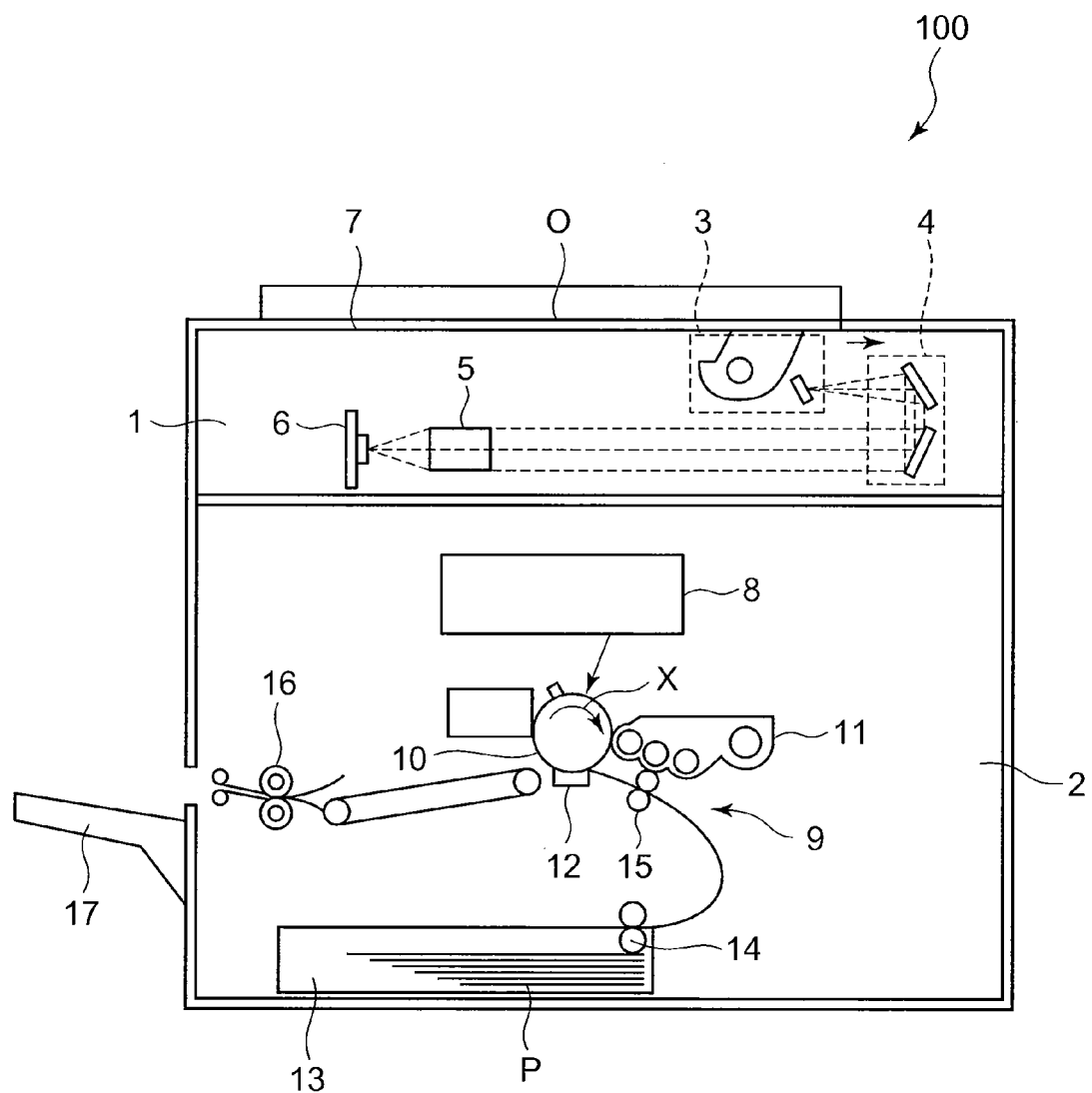
FIG. 1 is a schematic sectional view showing an image forming apparatus in a first embodiment.

FIG. 1 is a schematic sectional view showing an image forming apparatus 100. The image forming apparatus 100 includes a scanner 1 serving as imager reading means and a printer portion 2 serving as image forming means, for example. The scanner 1 includes a first carriage 3, a second carriage 4, an imaging lens 5 and a photoelectric conversion element 6. The first carriage 3 moves in the direction of an arrow shown in the drawing.

The scanner 1 sequentially reads an image of an original document O which is loaded on a document table 7 for every line. An image processing portion converts the read output into a digital image signal composed of 8 bits, for example, indicating the thickness of the image.

The printer portion 2 includes an optical scanning device 8 and an image forming portion 9. The image forming portion 9 is constructed by combining an electrophotographic system which is capable of forming an image on a sheet P serving as a recording medium. The sheet P is housed in a sheet cassette 13. At the time of image forming, the sheets P housed in the sheet cassette 13 are conveyed by a pickup roller 14 one by one, and conveyed to the image forming portion 9 by a conveying roller 15.

The image processing portion processes the image signal read by the scanner 1 from the original document O.

A semiconductor laser oscillator in the optical scanning device 8 irradiates laser beam corresponding to the image signal after processing.

The laser beam which is irradiated from the optical scanning device 8 is focused as a spot scanning light at an exposure position X on a photoconductive drum 10 serving as an image carrier, and is devoted to scanning exposure. As a result, an electrostatic latent image corresponding to the image signal is formed on the photoconductive drum 10.

The electrostatic latent image on the photoconductive drum 10 is changed to a toner image by toner (developer) from a developing device 11. A transfer charger 12 transfers the toner image on the photoconductive drum 10 onto the sheet P which is fed at an appropriate timing by a sheet feeding system at the point of the transfer position.

On the sheet P on which the image has been formed by the image forming portion 9, the image is fixed by a fixing device 16. A discharged sheet tray 17 is arranged at the downstream side of the fixing device 12, and the sheet P is discharged to the discharged sheet tray 17.

By repeating the above-described process, the image forming operation is carried out continuously.

Figure 2:
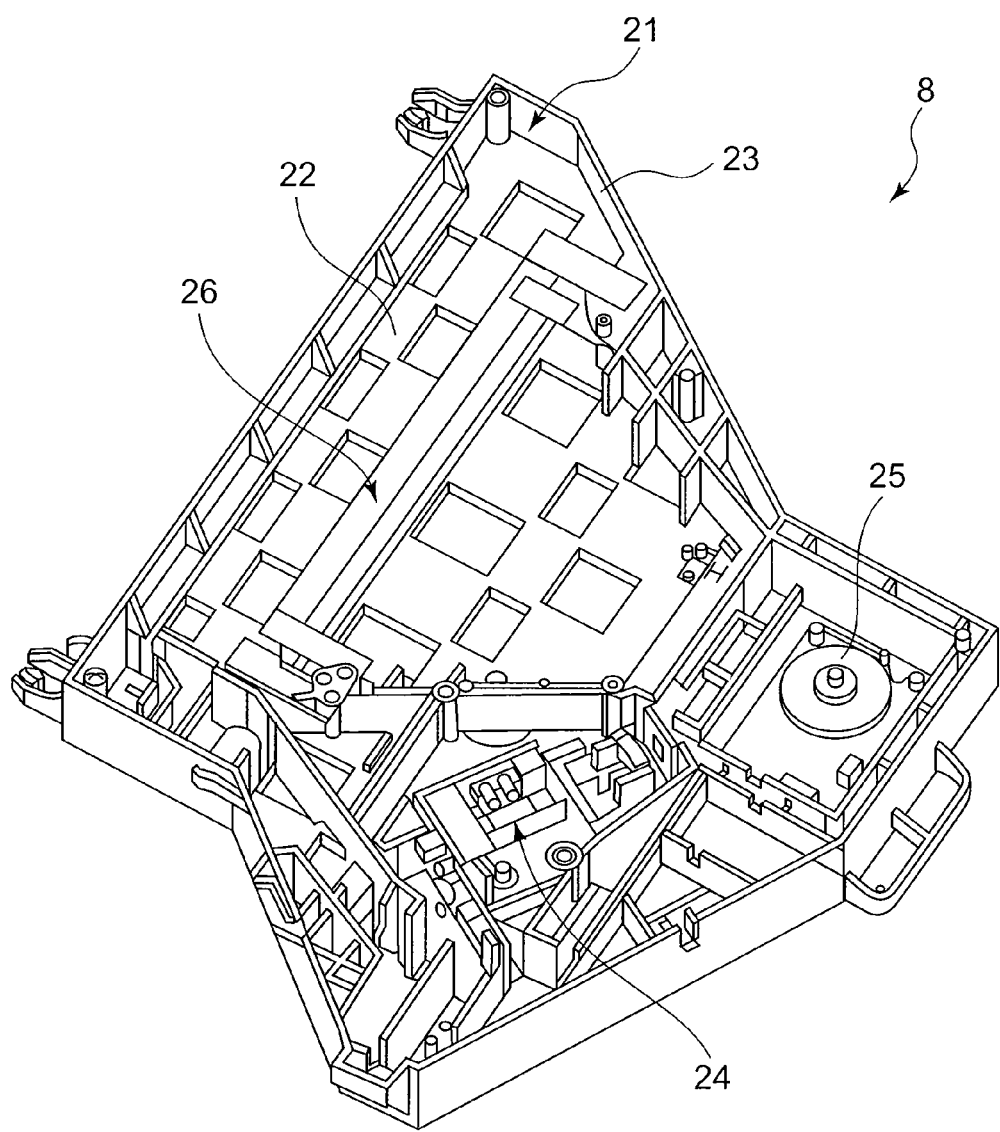
FIG. 2 is a perspective view showing a structure of an optical scanning device in the first embodiment.

Next, the optical scanning device 8 will be described. FIG. 2 is a perspective view of the optical scanning device 8. The optical scanning device 8 has a casing 21. The casing 21 includes a bottom portion 22 and a sidewall which uprises from the bottom portion 22, and they are integrally formed with synthetic resin, for example.

The upper surface of the casing 21 is covered with a cover. FIG. 2 shows the state in which the cover is uncovered, for convenience of description. Inside the casing 21, an optical source 24, a polygon mirror 25 and a mirror unit 26 are housed.

Figure 3:
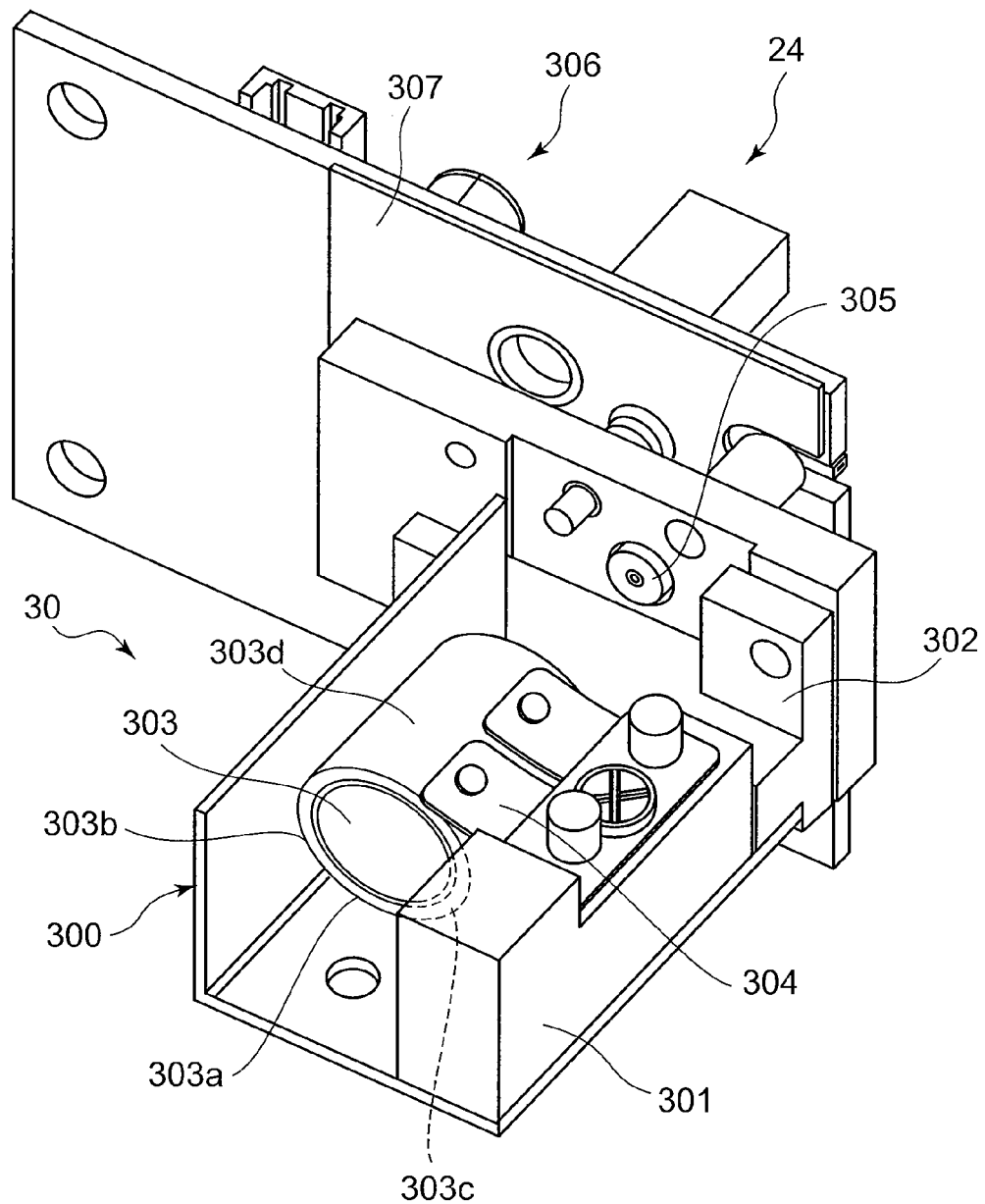
FIG. 3 is a perspective view showing a lens holding unit in the first embodiment.

The optical source 24 includes a laser diode 305 which emits laser beam toward the polygon mirror 25 and a collimator lens (hereinafter, referred simply to as a lens) 303 (FIG. 3). The laser diode 305 and the lens 303 are held by a lens holding portion 30. The polygon mirror 25 is rotated by a polygon motor not shown in the drawing, and composes a deflecting portion which deflects the image light in the main scanning direction. The optical source 24 will be described later.

The mirror unit 26 shown in FIG. 2 includes a return mirror which is held by a frame. The return mirror reflects the image light.

Figure 4:
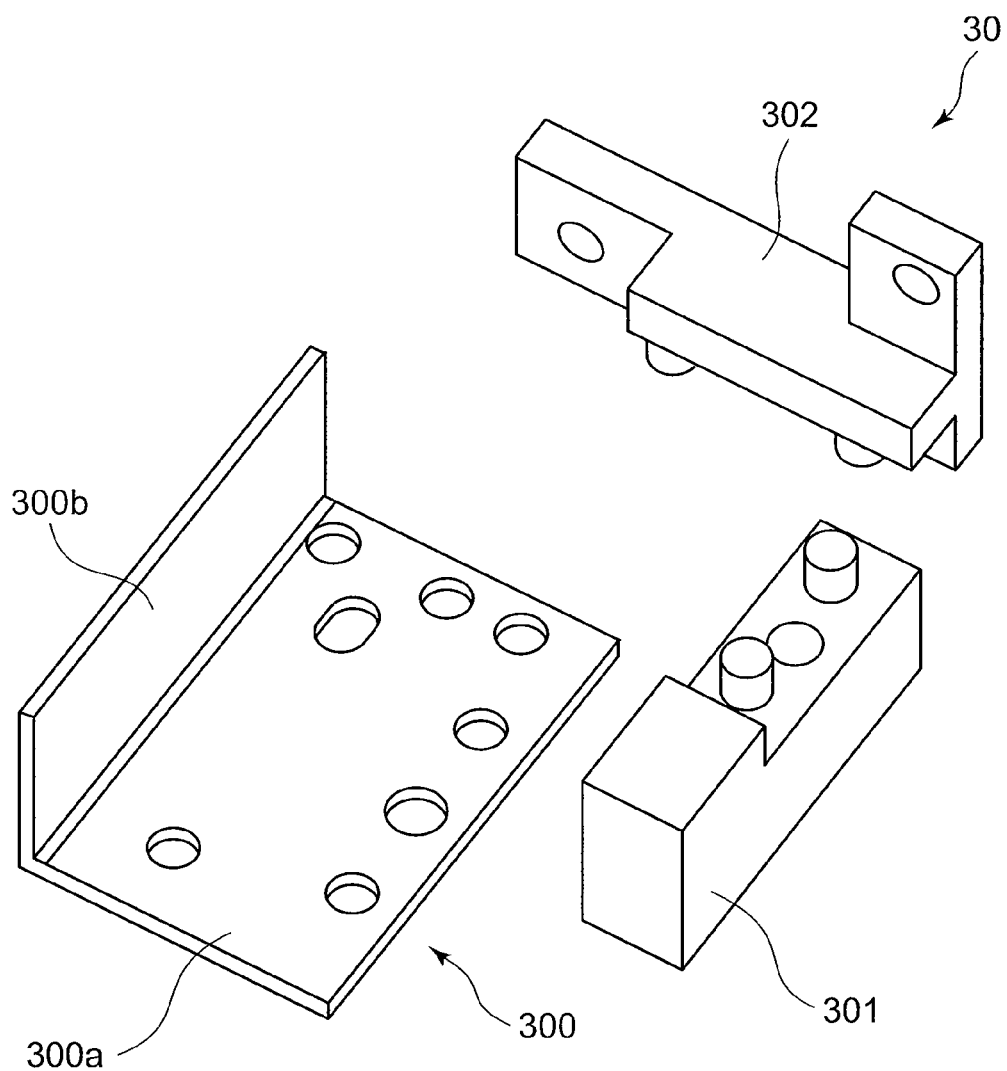
FIG. 4 is a exploded perspective view showing a lens holding portion in the lens holding unit in the first embodiment.
Figure 5:
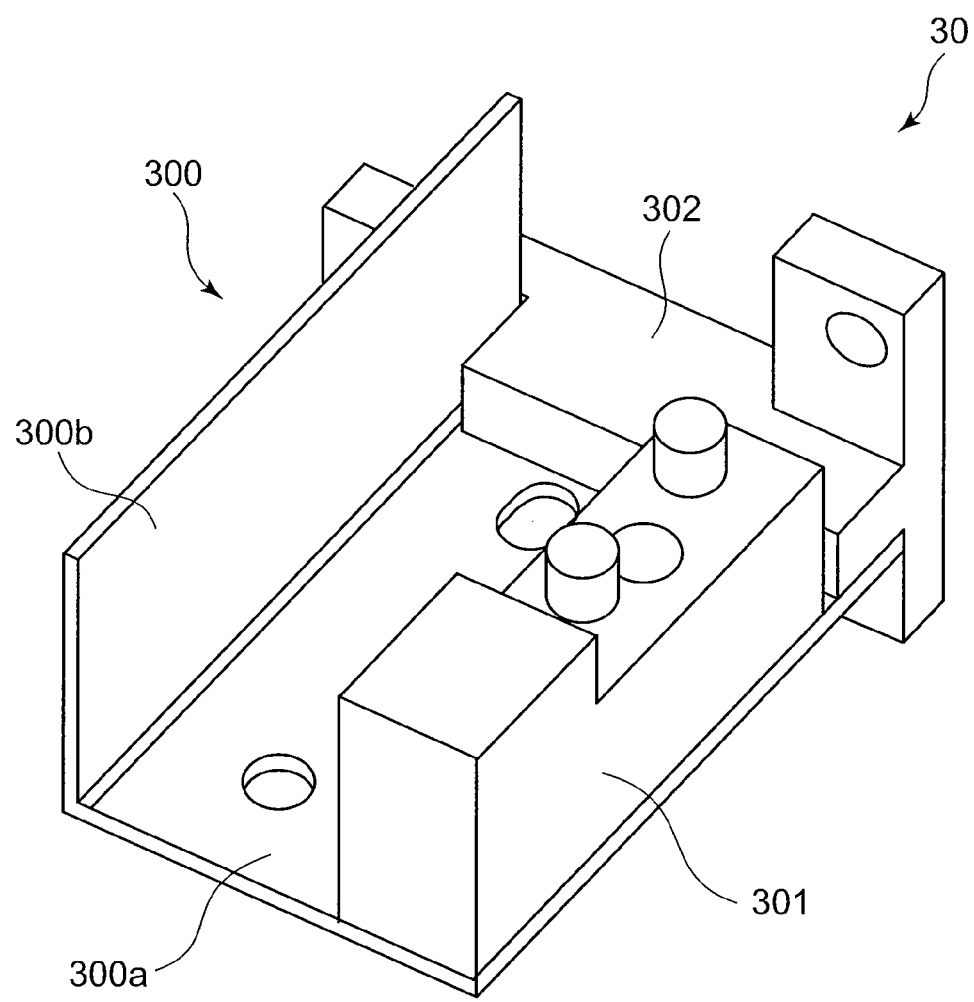
FIG. 5 is a perspective view showing an assembly structure of the lens holding portion in the lens holding unit in the first embodiment.

FIG. 3 is a perspective view showing a lens holding unit serving as the optical source 24. FIG. 4 is a perspective view showing the lens holding portion 30 in the disassembled state in the lens holding unit. FIG. 5 is a perspective view showing an assembly structure of the lens holding portion 30. The lens holding unit serving as the optical source 24 has the lens holding portion 30, the lens 303, and a laser diode control board holder 306 to hold the laser diode 305 and a laser diode control board 307. In addition, the lens 303 has a structure including a tubular body which houses and holds one collimator lens, for example. Or, the lens 303 has a structure including a tubular body which houses and holds a compound lens formed by jointing a plurality of lenses.

As shown in FIG. 4, the lens holding portion 30 has a sheet metal 300 which is bent into an L shape, a first resin member 301 on which a blade spring 304 to hold a top portion 303d of the lens 303 is to be fitted, and a second resin member 302 on which the laser diode control board holder 306 is to be fitted. The sheet metal 300 includes a bottom surface 300a and a sidewall 300b which uprises from the bottom surface 300a. The bottom surface 300a is a fitting reference plane for the first resin member 301 and the second resin member 302. A bottom portion 303a of the lens 303 contacts with the bottom surface 300a of the sheet metal 300, and a side portion 303b at one side of the lens 303 contacts with the sidewall 300b to thereby hold the lens 303. The first resin member 301 is fixed to the bottom surface 300a of the sheet metal 300, and contacts with a side portion 303c at the other side of the lens 303 to thereby hold the lens 303. The laser diode control board holder 306 is fitted on the second resin member 302.

The first resin member 301 on which the blade spring 304 for fixing the lens is fitted and the second resin member 302 on which the laser diode control board holder 306 is fitted are fixed on the fitting reference plane for the bottom surface 300a of this sheet plate 300 to thereby hold the lens 303. Positioning of the central axis of the lens 303 is performed by this holding. In addition, it is not limited that the blade spring 304 is fitted on the first resin member 301, but the blade spring 304 may be fitted on the sheet metal 300 or the second resin member 302.

As shown in FIG. 4, the first resin member 301 is arranged in parallel with the sidewall 300b of the sheet metal 300 through a prescribed distance, and in addition, arranged so as to form right angles to the second resin member 302 and the bottom surface 300a of the sheet metal 300, and is fitted on the sheet metal 300. The second resin member 302 is arranged to form right angles to the sidewall 300b of the sheet metal 300 and the bottom surface 300a of the sheet metal 300, and is fitted on the sheet metal 300.

The laser diode control board holder 306 holds the laser diode control board 307 and the laser diode 305. The laser diode 305 irradiates laser beam based on a laser light emission control signal from the laser diode control board 307. The laser beam to be irradiated is irradiated on the polygon mirror 25 through the lens 303.

The positioning of the central axis of the lens 303 is determined by contacting the lens 303 with the fitting reference bottom plane and the vertical plane. That is, the position of the central axis of the lens 303 is determined by the bottom surface 300a of the sheet metal 300, the sidewall 300b of the sheet metal 300 and the first resin member 301.

With the lens holding unit as described above, when the sheet metal 300 is bent at a right angle to form an L shape, the sheet metal 300 is easily-worked, and the post-processing can be eliminated. In addition, compared with one which is made by aluminium die casting, the material cost of the sheet metal 300 is lower, and the post-processing can be eliminated, so that the processing cost becomes low. In addition, at the time of adjusting the lens 303, when the lens 303 is moved back and forth, abrasion powder is not generated in the case of the sheet metal 300. The first and second resin members 301 and 302 are formed with simple shapes, so that it is easy to increase the accuracy thereof.

(Second Embodiment) A lens holding unit of an optical scanning device provided in an image forming apparatus according to a second embodiment is composed by the combination of an L-shaped sheet metal and a first resin member to hold a side portion of a lens. The same symbols are given to the same constituent portions as those in the first embodiment.

Figure 6:
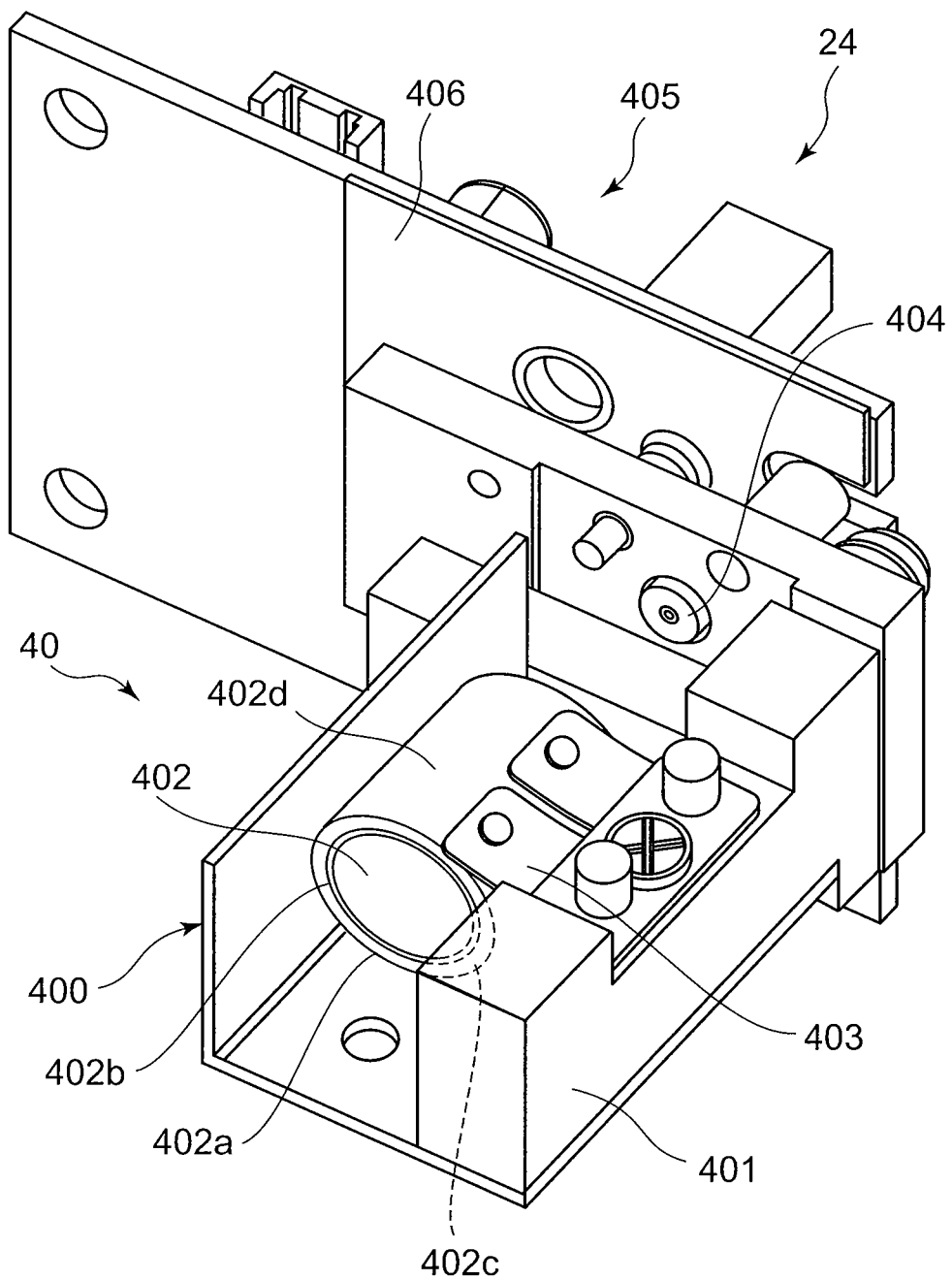
FIG. 6 is a perspective view showing a lens holding unit in a second embodiment.
Figure 7:
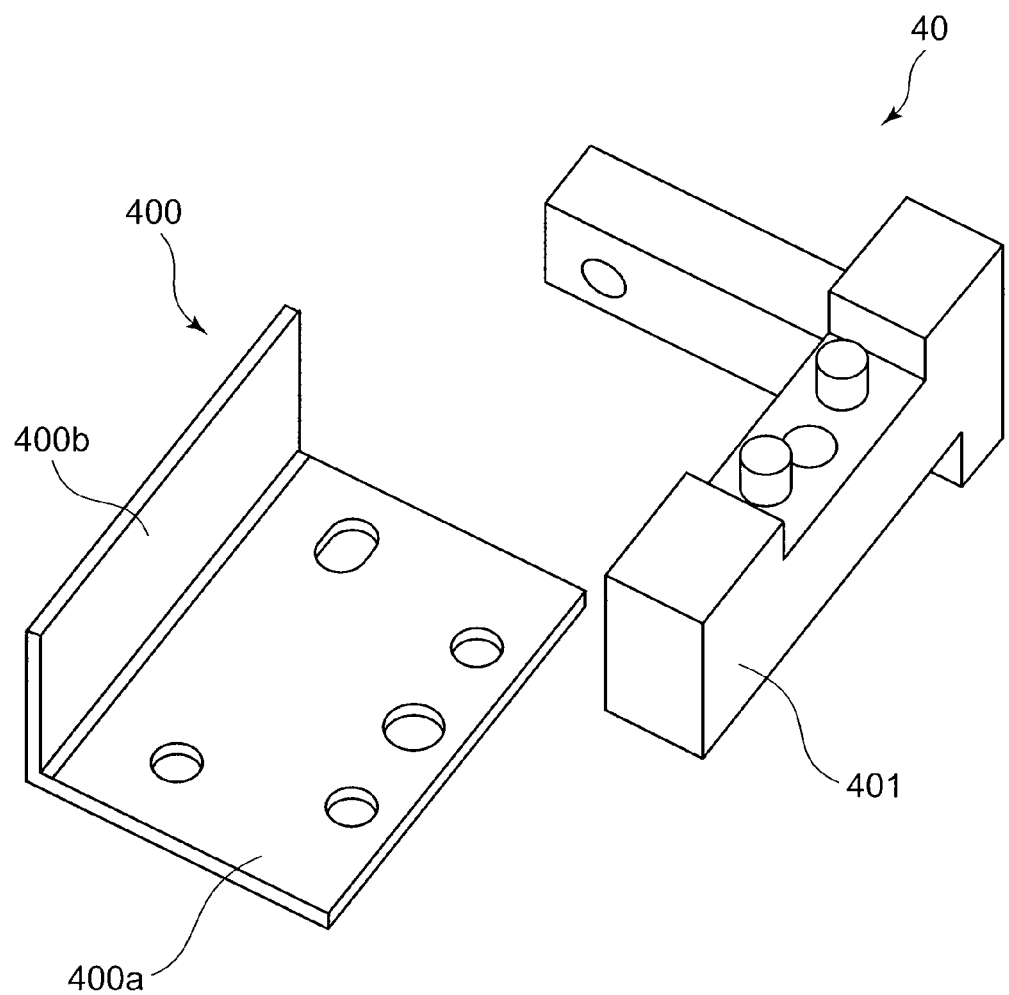
FIG. 7 is a exploded perspective view showing a lens holding portion in the lens holding unit in the second embodiment.
Figure 8:
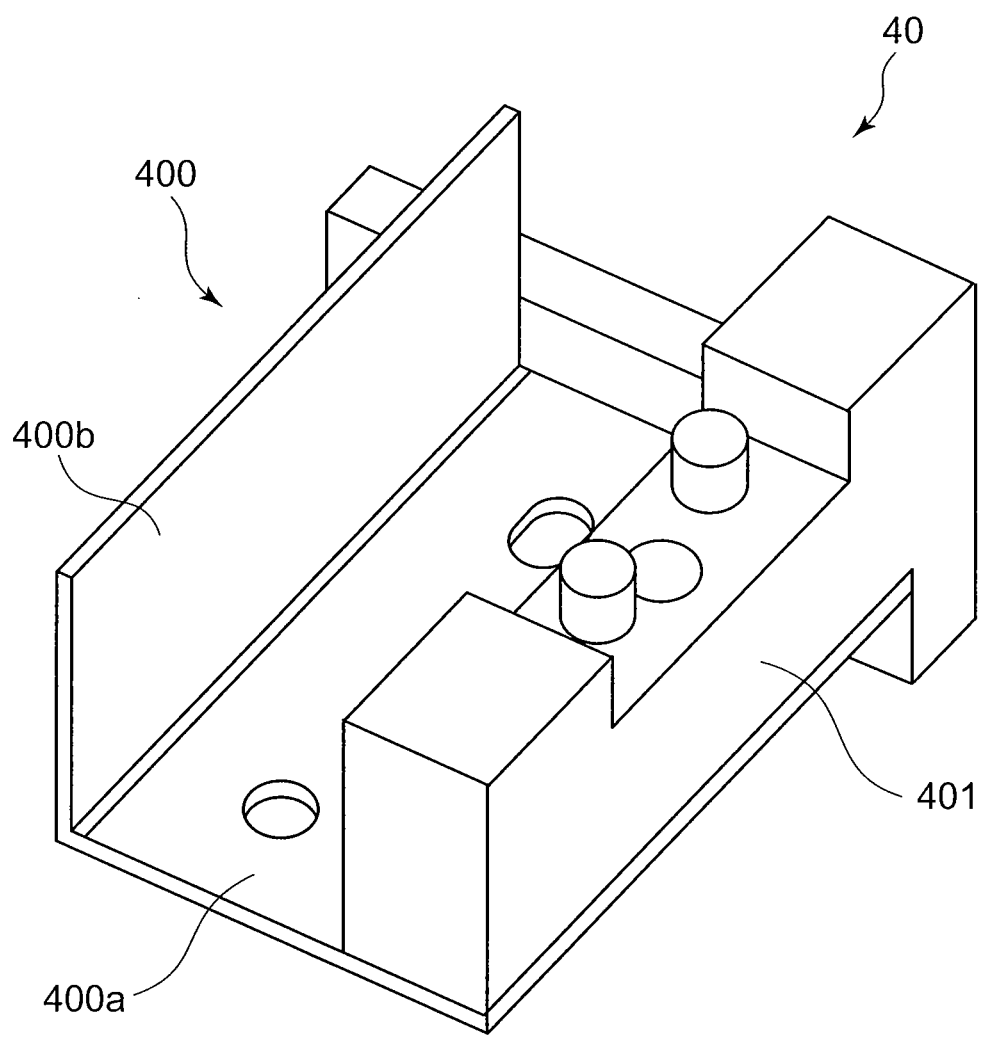
FIG. 8 is a perspective view showing the lens holding unit in the second embodiment.

FIG. 6 is a perspective view showing a lens holding unit serving as the optical source 24. FIG. 7 is a perspective view of a lens holding portion 40 in the disassembled state in the lens holding unit. FIG. 8 is a perspective view showing an assembly structure of the lens holding portion 40. The lens holding unit serving as the optical source 24 has the lens holding portion 40, a lens 402, and a laser diode control board holder 405 to hold a laser diode 404 and a laser diode control board 406.

As shown in FIG. 6, the lens holding portion 40 has a sheet metal 300 which is bent into an L shape, and a resin member 401 on which a laser diode control board holder 405 and a blade spring 403 to hold top portion 402d of the lens 402 are to be fitted. As shown in FIG. 7, the sheet metal 400 includes a bottom surface 400a and a sidewall 400b which uprises from the bottom surface 400a, and the bottom surface 400a is a fitting reference plane for the resin member 401. A bottom portion 402a of the lens 402 contacts with the bottom surface 400a of the sheet metal 400, and a side portion 402b at one side of the lens 402 contacts with the sidewall 400b to thereby hold the lens 402. A side portion 402c at the other side of the lens 402 contacts with the resin member 401 to thereby hold the lens 402.

The resin member 401 on which the laser diode control board holder 405 and the blade spring 403 for fixing the lens are to be fitted is fixed on the fitting reference plane for the bottom surface 400a of the sheet plate 400 to thereby hold the lens 303 and perform positioning of the central axis of the lens 402.

As shown in FIG. 7, the resin member 401 has an L shape made by forming integrally the first resin member 301 and the second resin member 302 which have been described in the first embodiment The resin member 401 formed in the L shape is arranged so as to form right angles to the sidewall 400b of the sheet metal 400 and bottom surface 400a of the sheet metal 400.

The laser diode control board holder 405 holds the laser diode control board 406 and the laser diode 404. The laser diode 404 irradiates laser beam based on a laser light emission control signal from the laser diode control board 406. The laser beam to be irradiated is irradiated to the polygon mirror 25 through the lens 402.

The positioning of the central axis of the lens 402 is determined by contacting the lens 402 with the fitting reference bottom plane and the vertical plane. That is, the position of the central axis of the lens 402 is determined by the bottom surface 400a of the sheet metal 400, the sidewall 400b of the sheet metal 400 and the resin member 401.

With the lens holding unit as described above, when the sheet metal 400 is bent at a right angle to form an L shape, the sheet metal 400 is easily-worked, and the post-processing can be eliminated. In addition, compared with one which is made by aluminium die casting, the material cost of the sheet metal 400 is lower, and the post-processing can be eliminated, so that the processing cost becomes low. In addition, at the time of adjusting the lens 402, when the lens 402 is moved back and forth, abrasion powder is not generated in the case of the sheet metal 400. The resin member 401 is formed with a simple shape, so that it is easy to increase the accuracy thereof. In addition, a plurality of the resin members are not used, but an integrated resin member is used, so that the number of the components can be made small.

While certain embodiments have been described, those embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A lens holding unit, comprising:
a laser diode configured to emit a laser beam;
a lens through which the laser beam passes;
a sheet metal having a bottom surface that holds a bottom portion of the lens and a sidewall extending from the bottom surface at a right angle and holding a first side portion of the lens;
a first resin member disposed on the bottom surface of the sheet metal and holding a second side portion of the lens opposite the first side portion of the lens; and
a blade spring affixed to the first resin member and holding a top portion of the lens.

2. The lens holding unit according to claim 1, further comprising:
a laser diode control board holder holding the laser diode and a laser diode control board, the laser diode control board being configured to supply a laser light emission control signal to the laser diode.

3. The lens holding unit according to claim 2, further comprising:
a second resin member disposed on the bottom surface and holding the laser diode control board holder.

4. The lens holding unit according to claim 3, wherein:
the first resin member and the second resin member are integrally formed.

5. An optical scanning device, comprising:
a laser diode configured to emit a laser beam;
a lens through which the laser beam passes;
a sheet metal having a bottom surface holding a bottom portion of the lens and a sidewall extending from the bottom surface at a right angle and holding a first side portion of the lens; and
a first resin member disposed on the bottom surface of the sheet metal and holding a second side portion of the lens opposite the first side portion of the lens;
a polygon mirror configured to reflect the laser beam which has passed through the lens; and
a blade spring affixed to the first resin member and holding a top portion of the lens.

6. The optical scanning device according to claim 5, further comprising:
a laser diode control board holder holding the laser diode and a laser diode control board, the laser diode control board being configured to supply a laser light emission control signal to the laser diode.

7. The optical scanning device according to claim 6, further comprising:
a second resin member disposed on the bottom surface and holding the laser diode control board holder.

8. The optical scanning device according to claim 7, wherein:
the first resin member and the second resin member are integrally formed.

9. An image forming apparatus, comprising:
a sheet feeding portion configured to feed a recording medium;
a laser diode configured to emit a laser beam;
a lens through which the laser beam passes;
a sheet metal having a bottom surface holding a bottom portion of the lens and a sidewall extending from the bottom surface at a right angle and holding a first side portion of the lens;
a first resin member disposed on the bottom surface of the sheet metal and holding a second side portion of the lens opposite the first side portion of the lens;
a polygon mirror configured to reflect the laser beam which has passed through the lens;
an image carrier configured to be irradiated with the laser beam that has been reflected by the polygon mirror;
a transfer device configured to transfer an image which has been formed on the image carrier onto the recording medium fed from the sheet feeding portion; and
a blade spring affixed to the first resin member and holding a top portion of the lens.

10. The image forming apparatus according to claim 9, further comprising:
a laser diode control board holder holding the laser diode and a laser diode control board, the laser diode control board being configured to supply a laser light emission control signal to the laser diode.

11. The image forming apparatus according to claim 10, further comprising:
a second resin member disposed on the bottom surface and holding the laser diode control board holder.

12. The image forming apparatus according to claim 11, wherein:
the first resin member and the second resin member are integrally formed.

* * * * *